United States Patent [19]
Campbell et al.

[11] 4,374,188
[45] Feb. 15, 1983

[54] ELECTRIC STORAGE BATTERY

[75] Inventors: Stephen W. Campbell, Camberley; Eric E. Cragg; Michael J. Elwell, both of West Midlands; Raymond A. Johnson, Birmingham, all of England

[73] Assignee: Lucas Industries Limited, Birmingham, England

[21] Appl. No.: 276,383

[22] PCT Filed: Oct. 13, 1980

[86] PCT No.: PCT/GB80/00163
§ 371 Date: Jun. 10, 1981
§ 102(e) Date: Jun. 10, 1981

[87] PCT Pub. No.: WO81/01074
PCT Pub. Date: Apr. 16, 1981

[30] Foreign Application Priority Data
Oct. 13, 1979 [GB] United Kingdom ................. 7935626

[51] Int. Cl.³ ............................................. H01M 2/10
[52] U.S. Cl. ..................................... 429/187; 16/125; 16/DIG. 15
[58] Field of Search .................. 429/187, 163; 16/125, 16/126, DIG. 15

[56] References Cited
U.S. PATENT DOCUMENTS
971,876 10/1910 Apple .................................. 429/187
3,167,808 2/1965 Lindenberg et al. ................ 429/163

FOREIGN PATENT DOCUMENTS
869329 5/1961 United Kingdom ................ 429/187
1453977 10/1976 United Kingdom ................ 429/187

Primary Examiner—Donald L. Walton
Attorney, Agent, or Firm—Ladas & Parry

[57] ABSTRACT

A container element (11) for an electric storage battery includes a pair of carrying handles (15) extending between respective pairs of spaced holes formed in projecting lugs (13) on the container element (11). Each handle (15) includes at least one strip of rope (16) or similar flexible material passing through the associated pair of holes and joined at the ends to define a continuous loop.

11 Claims, 3 Drawing Figures

ELECTRIC STORAGE BATTERY

This invention relates to an electric storage battery.

It is well known to provide handles on the external surface of an electric storage battery so as to facilitate carriage of the battery. However, although various alternative types of battery carrying handle have been proposed, to date none of these have proved satisfactory, particularly for use on heavy duty lead-acid batteries for large earth moving equipment. For example, one of the earliest proposals was to use a synthetic resin rope for each carrying handle and glue the ends of the rope in respective recesses in the battery lid by means of an epoxy resin adhesive. However, this technique suffers from the disadvantage that the use of an epoxy resin adhesive to secure the ropes in place adds significantly to the time required to assembly the battery. Also, the strength of the epoxy resin bond is insufficient to allow this technique to be used in the heaviest batteries, where the handles must be able to withstand a load of about 90 Kg applied in any direction without adverse effect.

An alternative proposal, also employing synthetic resin ropes, is to thread the ends of each rope through respective, perforated lugs provided on a side or end wall of a battery box and then knot the ends of the rope so that they will no longer pass through the holes in the lugs. Again, however, this leads to an undesirable increase in the battery assembly time, since with the rope thicknesses required, knotting the ends of the rope is difficult. Moreover, with the heaviest batteries it is found that the lugs tend to shear in the region of the holes and the outermost edges of the lugs. Although this problem is theoretically soluble by sufficiently increasing the dimensions of these regions of the lugs, in practice this solution is precluded by the restrictions imposed on the maximum external dimensions of the battery container and the minimum internal volume required for the battery plates. Various proposals have been put forward in an attempt to overcome the problem of lug shearing such as, for example, increasing the depth of the lugs and hence the length of the holes, inclining the holes in the lugs at an angle to the walls of the battery box, and securing reinforcing metal plates to the outermost edges of the lugs. However, none of these proposals has proved entirely satisfactory.

An object of the present invention is therefore to provide an electric storage battery having carrying handles in which the above-mentioned disadvantages are alleviated or minimised.

Accordingly, the invention resides in a container element for an electric storage battery including a pair of carrying handles extending between respective pairs of spaced holes formed in projecting lugs on the container element, each handle including at least one strip of rope or similar flexible material passing through the associated pair of holes and joined at the ends to define a continuous loop.

The provision of the looped handles on the container element described in the preceding paragraph means that, when a battery including the element is lifted, a double thickness of said rope or other similar flexible material is available for gripping the handle. Using this arrangement with normal sized projecting lugs without any reinforcement, it is found that even the heaviest batteries can be lifted without the lugs being damaged, possibly because the looped handles spread the lifting force more evenly than conventional rope handles.

Preferably, the container element is a battery box.

Preferably, the portions of each loop extending between the associated pair of holes are held in juxtaposition so as to ensure that each handle is gripped by way of a double thickness of said rope or similar material.

Preferably, said portions of each loop are held in juxtaposition by a relatively rigid sleeve through which the portions pass and which, in use, is gripped when it is required to lift the battery.

Alternatively, said portions of each loop are held in juxtaposition by moulding a handle grip around the portions and preferably said moulding operation also serves to join the ends of the rope.

Conveniently, each handle extends between a pair of spaced holes provided in a single projecting lug.

Alternatively, each handle extends between spaced holes provided in a pair of projecting lugs respectively.

Preferably, each handle is defined by a single strip of rope, more preferably a single strip of synthetic resin rope.

Conveniently, the ends of the rope are joined together by moulding a synthetic resin material around the ends of the rope.

In the accompanying drawings, which illustrate one example of the invention,

Figure 1:
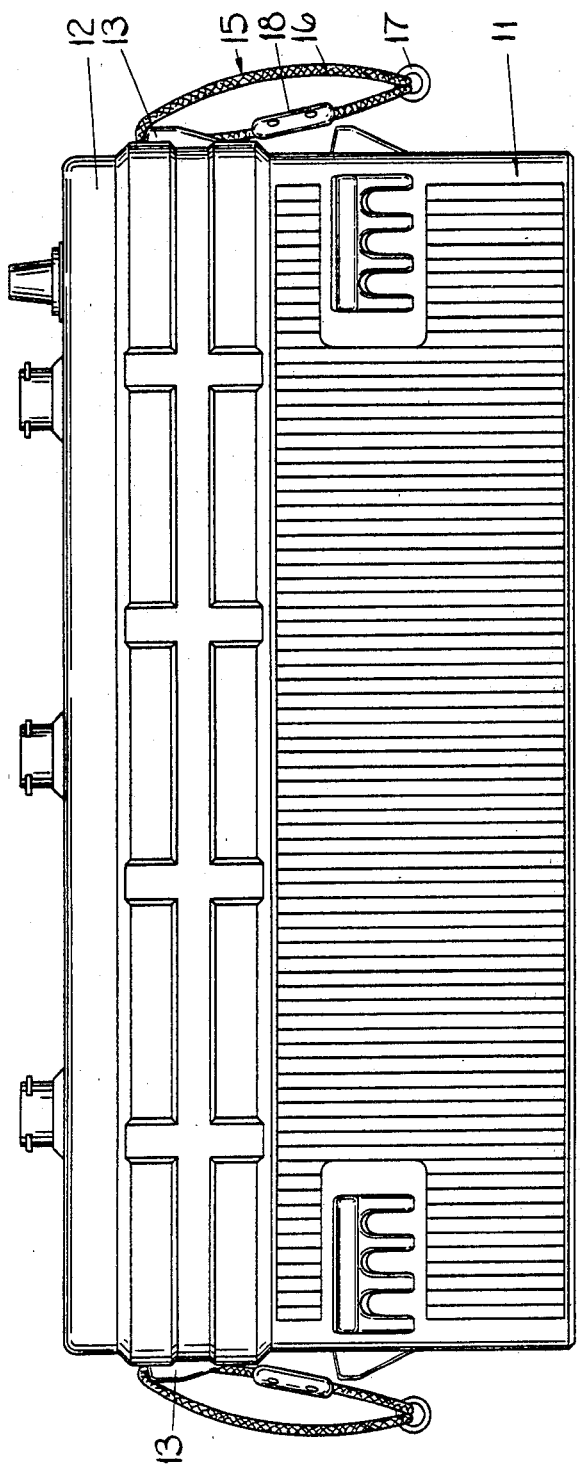
FIG. 1 is a side view of a lead-acid battery.
Figure 2:
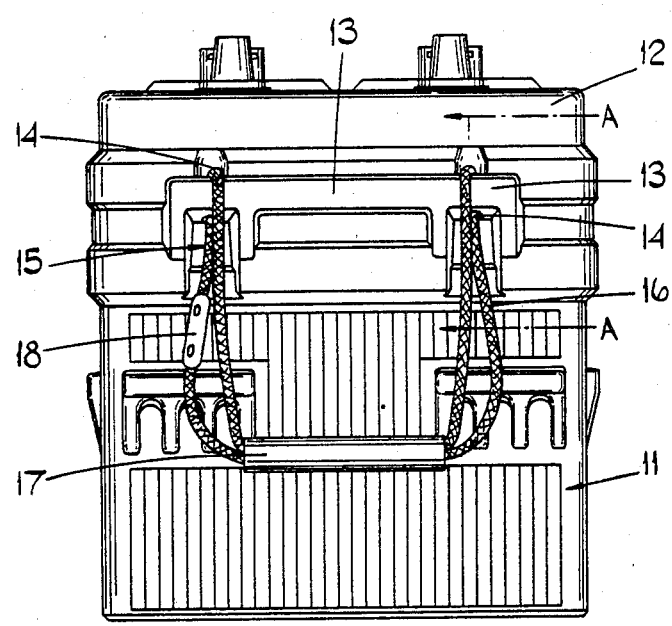
FIG. 2 is an end view of the battery.
Figure 3:
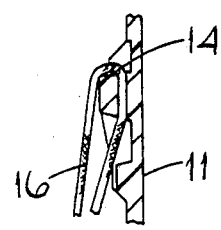
FIG. 3 is a sectional view taken along the line A—A in FIG. 2.

Referring to the drawings, the lead-acid battery shown is for use in earth-moving equipment and includes a moulded rectangular battery box 11 housing the electrochemically active elements of the battery and a rectangular moulded lid 12 secured to and closing the box 11. Conveniently the box and lid are each moulded in a hard rubber material. Formed integrally along each of the end walls of the box 11 is an elongated projecting lug 13 which is provided adjacent its opposite ends with respective through-holes 14 which extend between the upper and lower surfaces of the lug generally parallel with the respective end wall of the box 11. Supported between the pair of apertures 14 in each lug 13 is a respective carrying handle 15.

Each handle 15 includes a single strip of braided polypropylene rope 16 which has been passed through its respective apertures 14 and joined at its ends to define a continuous loop. Moreover, each strip of rope 16 is passed twice through a synthetic resin sleeve 17, which is arranged to be relatively rigid compared with the rope 16. In use, when it is required to lift the battery, the handles 15 are gripped by way of the sleeves 17, whereby the force required to lift the battery is applied to the lugs 13 by way of the double thicknesses of rope defining the handles. In this way, using standard thickness lugs 13 without reinforcement, it is found that the battery can readily be lifted without any adverse affect on the lugs. The reason for this result is believed to be that the double thicknesses of rope spread the lifting force more evenly over the lugs 13.

In one practical example, using a moulded hard rubber battery box 11 in hich the lugs had a depth of about 19 mm, each hole 14 had a diameter of about 7 mm and was spaced by about 7 mm from the outer edge of the lug, the lugs showed no adverse affect when tested with a 90 Kg load applied in any direction. By way of contrast, using conventional knotted rope handles, it was found that the lugs cracked when subjected to a load of only 51 Kg.

Conveniently, each rope 15 is joined at its ends to define the required looped handles 16 by moulding a short connector member 18 in an acid-resistant synthetic resin material, such as polypropylene, around the ends of the rope. However, as an alternative to the example described above, moulding the acid-resistant synthetic resin material around the ends of each rope could serve not only to join the ends of the rope but also to produce a handle grip surrounding part of the portions of the rope extending between the associated holes 14. In this case the handle grip would replace the sleeve 17. As a further alternative to the example described above, the lugs could be provided on the battery lid 12, although this arrangement is not preferred since of course lifting the battery then applies a force tending to rupture the join between the lid 12 and the box 11.

Although in the above example, polypropylene rope has been used as the material of the handles 15, it is to be appreciated that other acid-resistant rope materials, such as polyethylene terephthalate could have been used. In addition, acid-resistant elongated flexible materials other than rope could have been used for the handles 15, such as a single filament of polypropylene, but rope is preferred because of its strength and low stretchability.

We claim:

1. A container element for an electric storage battery including a pair of carrying handles extending between respective pairs of spaced holes formed in projecting lugs on the container element, each handle including at least one strip of rope or similar flexible material passing through the associated pair of holes and joined at the ends to define a continuous loop, the portions of each loop extending between the associated pair of holes being held in juxtaposition so as to ensure that each handle is gripped by way of a double thickness of said rope or similar material.

2. A container element as claimed in claim 1, wherein the container element is a battery box.

3. A container element as claimed in claim 1 or claim 2, wherein said portions of each loop are held in juxtaposition by a relatively rigid sleeve through which the portions pass and which, in use, is gripped when it is required to lift the battery.

4. A container element as claimed in claim 1 or claim 2, wherein said portions of each loop are held in juxtaposition by moulding a handle grip around the portions.

5. A container element as claimed in claim 4, wherein moulding of said handle grip also serves to join the ends of the rope.

6. A container element as claimed in claim 1, wherein each handle extends between a pair of spaced holes provided in a single projecting lug.

7. A container element as claimed in claim 1, wherein each handle extends between spaced holes provided in a pair of projecting lugs respectively.

8. A container element as claimed in claim 1, wherein each handle is defined by a single strip of rope.

9. A container element as claimed in claim 8, wherein the rope is a synthetic resin rope.

10. A container element as claimed in claim 9, wherein the ends of the rope are joined together by moulding a synthetic resin material around the ends of the rope.

11. A lead-acid battery including a container element as claimed in claim 1.

* * * * *